United States Patent [19]
Sever et al.

[11] Patent Number: 5,026,026
[45] Date of Patent: Jun. 25, 1991

[54] LOCKING DEVICE FOR GAS REGULATOR AND CONTROL APPARATUS

[75] Inventors: Robert E. Sever, Florissant; Dave L. Woodring, St. Louis, both of Mo.

[73] Assignee: Essex Industries, Inc., St. Louis, Mo.

[21] Appl. No.: 546,869

[22] Filed: Jul. 2, 1990

[51] Int. Cl.⁵ .................. F16K 31/44; F16K 35/00
[52] U.S. Cl. .................................. 251/230; 74/25; 74/548; 74/575; 137/315; 137/505.25; 192/67 R; 192/95; 251/229; 403/1
[58] Field of Search ............... 74/25, 111, 552, 553, 74/554, 548, 575; 192/67 R, 95; 251/89, 95, 96, 100, 101, 102, 104, 105, 111, 113, 229, 230, 291, 292; 403/1; 137/315, 505.25

[56] References Cited

U.S. PATENT DOCUMENTS

| | | | |
|---|---|---|---|
| 1,250,237 | 12/1917 | Snyder et al. | 251/100 |
| 2,780,333 | 2/1957 | Reiser et al. | 192/67 R |
| 2,797,592 | 7/1957 | Marrapese | 192/67 R |
| 2,899,841 | 8/1959 | Melloy | 192/67 R |
| 3,035,605 | 5/1962 | Ninnelt | 251/111 |
| 3,193,243 | 7/1965 | Billington et al. | 251/96 |
| 3,298,661 | 1/1967 | Stam | 251/104 |
| 3,426,790 | 2/1969 | Dey | 137/505.25 |
| 3,698,425 | 10/1972 | Fisher | 137/505.25 |
| 4,221,238 | 9/1980 | Madsen | 251/230 |
| 4,655,246 | 4/1987 | Phlipot et al. | 251/206 |

Primary Examiner—George L. Walton
Attorney, Agent, or Firm—Kalish & Gilster

[57] ABSTRACT

A locking device for use with a gas flow distribution device to be connected to a source of gas under pressure. The device has a yoke for securement to the source and a fastening screw threaded in the yoke for securing the device to the gas source. The locking screw has a tee-shaped handle. The locking device has a collar including a sleeve defining opposed openings for engagement of the yoke to permit longitudinal movement relative to the yoke but substantially prevents rotation of the sleeve relative to the yoke. The collar has a yoke-remote portion including a plurality of handle-engaging recesses. A spring biases the collar outwardly from the yoke into locking engagement with the handle for preventing unintended unfastening of the screw.

13 Claims, 2 Drawing Sheets

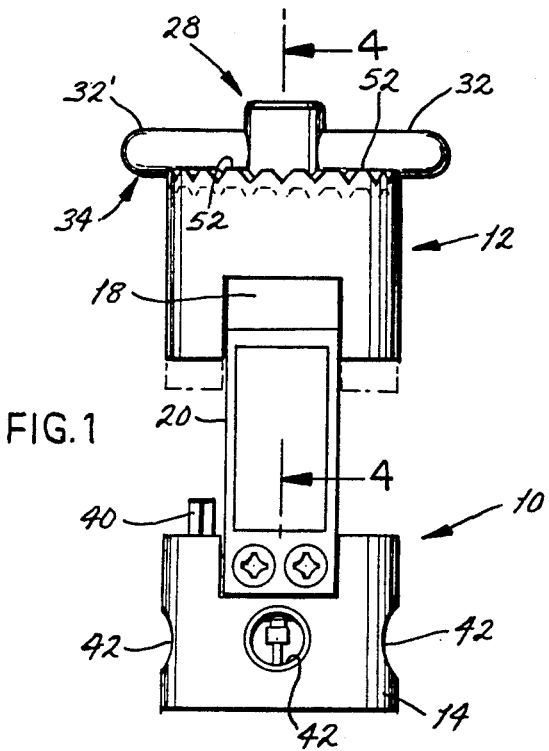
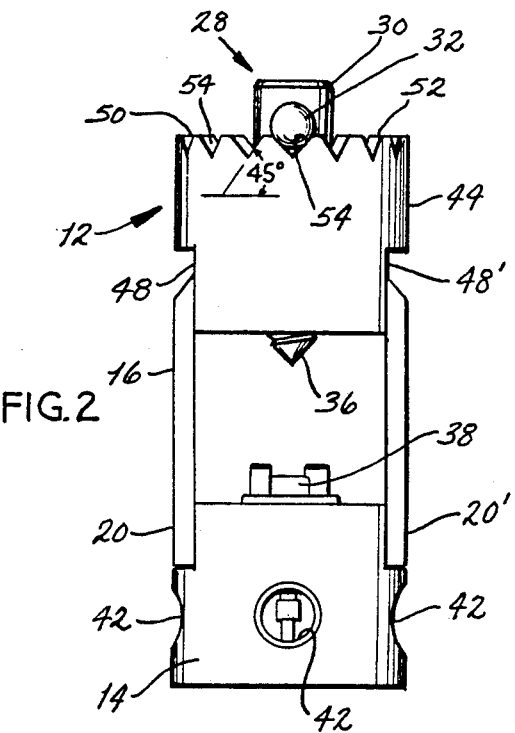
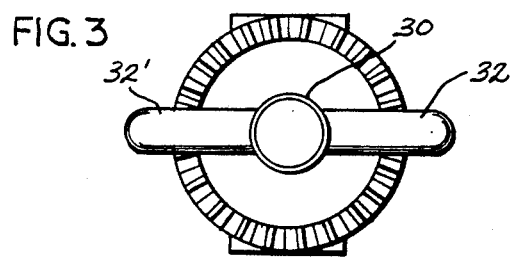
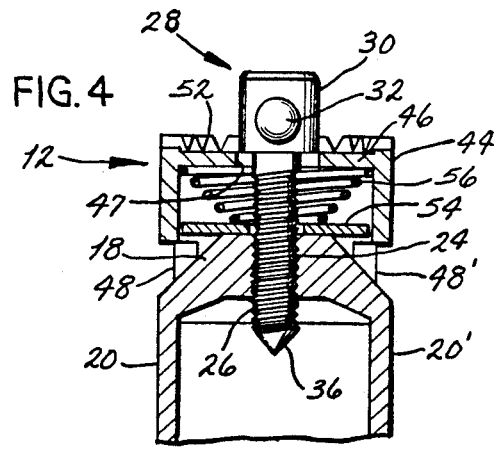
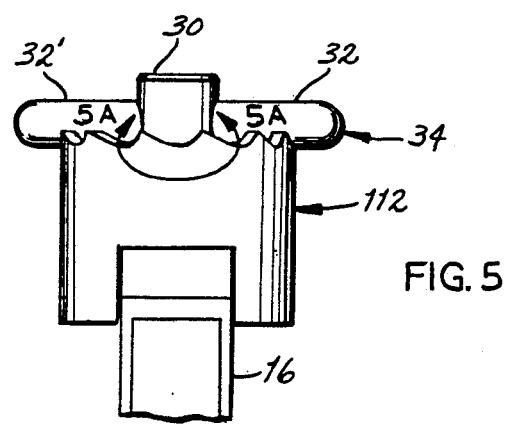

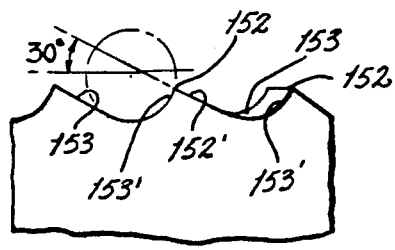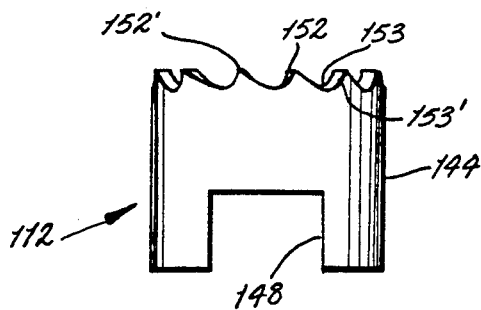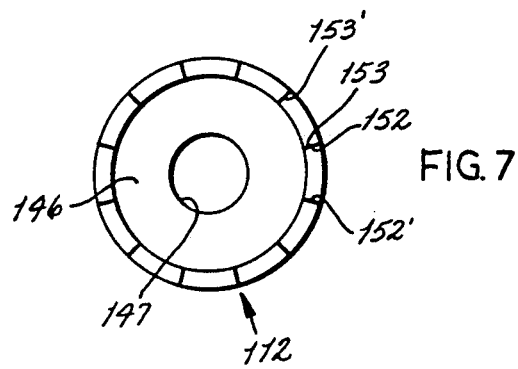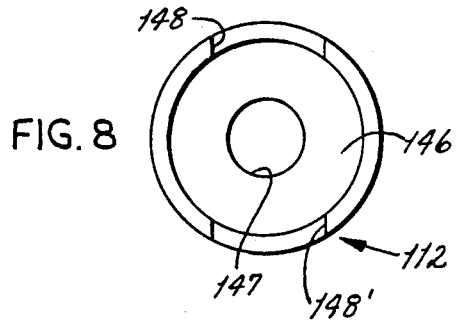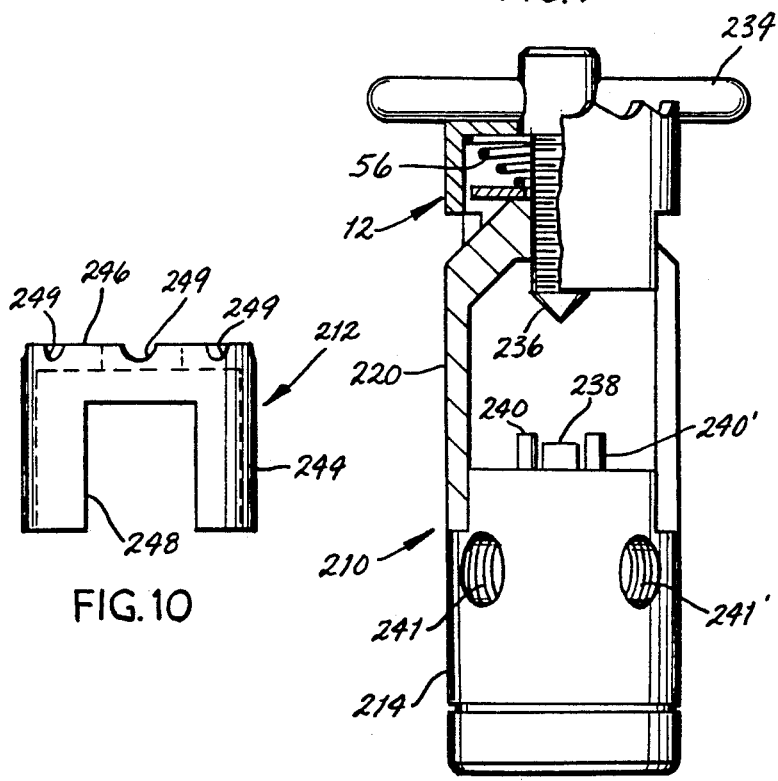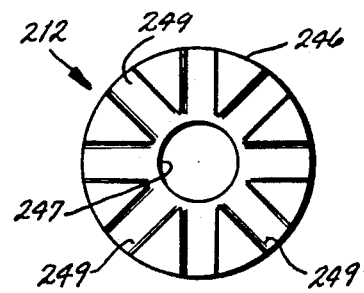

LOCKING DEVICE FOR GAS REGULATOR AND CONTROL APPARATUS

BACKGROUND AND SUMMARY OF THE INVENTION

This invention relates to gas flow distribution devices and, more particularly, to a device for locking such device such as particularly a manifold assembly, a gas pressure regulator or a gas regulator/flow control to a source of gas under pressure, e.g., a pressurized oxygen cylinder, in connected relation.

Compact gas pressure regulators or regulators combined with gas flow control apparatus, as disclosed, for example, in U.S. Pat. No. 4,655,246, as well as manifold assemblies are often attached directly to high pressure gas sources such as oxygen cylinders, in mated relationship. In such oxygen cylinders, oxygen is stored at high pressure such as 500-2000 and up to 3000 p.s.i.g. Such pressure cylinders may provide the supply of oxygen for medical or emergency usage in aircraft such as rotary-wing aircraft (helicopters) for medical evacuation (so called "Medi-Vac") use. These aircraft typically exhibit and experience high vibration levels as compared with fixed-wing aircraft. Pressurized oxygen cylinders may also be used in other vibration-intensive situations, as in ambulances. In these applications, it is desirable for the regulator or regulator/flow control to be securely attached to the high pressure source so that, because of vibration or through handling or misuse, the device, whether it be a manifold, a regulator or a regulator/flow control, will not come loose from the cylinder. If it were to come loose, there could be leakage of high pressure gas, constituting a hazard. On the other hand, any such locking device must not interfere with the securement and connection of the device to the high pressure source and must always permit its ready attachment to the pressure cylinder. Moreover, it is desirable also that the locking device not interfere with the normal operation of fastening means of the device when it is necessary to remove the device from the gas source.

Accordingly, among the objects of the invention may be noted the provision of a locking mechanism for a gas handling device, such as a manifold assembly, pressure regulator or regulator/flow control, for ensuring the reliable attachment of such device to the gas source, e.g., a cylinder of oxygen or other gas under high pressure as for use exemplarily on aircraft; which reliably locks a tightening handle of such a device to ensure that the handle does not become loose either from vibration or misuse when the device is secured to a high pressure cylinder, such as a cylinder of oxygen to be regulated by the regulator for subsequent delivery; which does not interfere with the attachment of the device to the cylinder, permitting rapid attachment of same and tightening in a normal manner but, when in place, preventing any untightening movement without deliberate release action; which does not interfere with removal or replacement of the device, such as for the purpose of changing the device to a different gas cylinder; which is constructed with relatively few parts in an economical manner; and which is reliable as well as long-lasting in operation.

Briefly, the invention provides a locking device for use with a gas flow distribution device to be connected to a source of gas under pressure, the device having a yoke for securement to the source and a fastening screw threaded in the yoke for securing the device to the gas source. The locking screw has a tee-shaped handle portion, i.e., a handle.

The locking device comprises a collar including a sleeve defining opposed openings for engagement of the yoke to permit longitudinal movement relative to the yoke but substantially prevents rotation of the sleeve relative to the yoke. The collar has a yoke-remote portion including a plurality of handle-engaging recesses, and means resiliently biasing the collar outwardly from the yoke into locking engagement of the handle-engaging recesses with the handle portion for preventing unintended unfastening of the screw.

Other objects and features will be in part apparent and in part pointed out hereinbelow.

BRIEF DESCRIPTION OF THE DRAWINGS

FIG. 1 is a side elevation view of a gas manifold assembly configured with a locking device in accordance with the present invention.

FIG. 2 is a front elevation view thereof.

FIG. 3 is a top plan view of the manifold assembly equipped with the locking device of this invention.

FIG. 4 is a partial vertical cross section of portions of the manifold assembly and locking device as taken generally along line 4—4 of FIG. 1.

FIG. 5 is a partial elevation view of such a manifold assembly with a modified version of a locking collar thereon.

FIG. 5A is an enlarged section of the locking collar of FIG. 5 as taken along line 5A—5A thereof.

FIG. 6 is a side elevation view of one form of locking collar of the invention.

FIGS. 7 and 8 are respectively top and bottom plan views thereof.

FIG. 9 is a front elevation view, partially broken away, of a gas pressure regulator assembly provided with another version of locking collar in accordance with the present invention.

FIG. 10 is a side elevation view of the locking collar of FIG. 9.

FIG. 11 is a top plan view of the locking collar of FIG. 9.

Corresponding reference characters indicate corresponding parts throughout the several views of the drawing.

DESCRIPTION OF THE PREFERRED EMBODIMENT

Referring now to FIGS. 1-4, illustrated generally at reference character 10 is a manifold assembly of conventional type equipped with a locking collar, generally designated at 12, configured in accordance with one preferred version of the invention.

Manifold assembly 10, as typical of a gas flow distribution device of the general character with which the invention is useable, includes a body 14 from which extends upwardly a yoke 16 having the shape of a generally inverted "U". The yoke includes a crown 18 of relatively thickened proportion from which extend downwardly on opposite sides legs 20, 20' which are secured by machine screws, as at 22 to manifold body 14.

Crown 18 is provided with a threaded bore 24 into which is screwed a correspondingly threaded shank 26 of a tee-handle fastening screw designated in its entirety generally by reference character 28. Tee-handle screw includes an enlarged head 30 of cylindrical form. From the sides of head 30 project opposite symmetrical end portions 32, 32' of a tightening bar designated generally 34. Bar 34, of circular section, extends through a bore in head 30 and is fixed therein.

Bar 34 is twisted by hand for tightening or loosening stem 26. This stem includes a conical tip 36 for engaging structure associated with the outlet fixture of a high pressure gas cylinder such as contains breathing oxygen for medical usage. Cylinders of this type are utilized in air ambulances, medical evacuation helicopters, and other mobile or vehicular-borne systems. The cylinders may be of other portable emergency type. In these kinds of cylinders, oxygen is stored at pressures typically for use in breathing or resuscitation systems. In order to secure assembly 10 in place, and for providing communication with such a gas cylinder, tightening of the stem 26 urges a nipple inlet 38 into communication with a valve outlet of the gas cylinder. A pair of guides 40, 40' fit into corresponding recesses of the gas cylinder, if of proper type, for providing oxygen to assembly 10, and guide the nipple inlet into proper position. Apertures are provided in base 14 for receiving either plugs or nipple connections for delivery of oxygen under pressure to other components of an oxygen distribution system.

Locking collar 12 is formed of a cylindrical metal alloy sleeve 44 closed at its upper, yoke-remote end by an annular plate 46 of the same alloy to define a central opening 47 (FIG. 4) through which stem 26 extends. Sphere 48 is of slightly greater diameter than stem head 30 so that the head may be extended through such recess. Sleeve 44 is open at its lower end and is provided with diametrically opposed rectangular recesses 48, 48' which open from the lower periphery of sleeve 44 and extend upward approximately half the height of the wall of sleeve 44.

In the version illustrated in FIGS. 1-4, locking collar 12 is provided at its yoke-remote upper periphery with an annular crown flange 50 of toothed configuration. Each tooth 52 of crown flange 50 is defined by shoulders which slope downwardly from a flat-topped tip of the tooth symmetrically at an angle of approximately 45° to vertical. Between each tooth 52 there is a vee-shaped recess 54. Further, the number of teeth 52 and spacing between teeth is selected relative to the provides diammetrical opposition of recesses 54 so that the handle portions 32, 32' will be permitted to rest within a pair of diametrically opposed recesses 54 for locking purposes described below.

Seated on crown 18 of the yoke is a flat washer 54 having an inner diameter slightly greater than the shank 26 for loose fit and an outer diameter slightly less than the inside diameter of sleeve 44. Seated in turn upon washer 54 is a coiled compression spring 56 of conical type so that its large diameter bears against plate 46 and its lower end against washer 54. Spring 54 biases sleeve 44 upwardly, urging teeth 52 into contact with handle portions 32, 32' with the sleeve concentric with screw shank 26. Further, sleeve 44 is free to rotate only slightly relative to yoke 16 with lost motion, as the width of recesses 48, 48' is slightly greater than the width of the yoke. For these reasons, sleeve 44 will be caused by spring 56 to present an opposed pair of recesses 54 for receiving each of the handle members 32, 32', but further rotation of collar 12 is prevented by engagement of the side edges of the recesses 48, 48' against the surfaces of yoke 16. This has the effect of locking bar 34 in position and so preventing rotation of shank 26. A spring constant for spring 56 is selected to permit collar 12 to be shifted in response to a manual rotation of the tee-handle to permit the user to either tighten or loosen the shank by rotation of said portions 32, 32'. When handle is released, spring 56 shifts it axially toward engagement of handle portions 32, 32' to prevent once more rotation, even though the unit may be exposed to vibration or to inadvertent bumping or other contact of the exposed handle portions 32, 32' which otherwise might loosen same. The inverse conical spring configuration permits sleeve 12 to rock readily about yoke crown 18 for improving collar recess engagement with handle portions 32, 32' but openings 48, 48' are sized for permitting collar 12 to be moved longitudinally (as shown in phantom in FIG. 1) relative to yoke 16 and to rotate a few degrees but these openings prevent the collar from further rotating relative to the yoke more than said few degrees, such as about 5°–10°.

Referring now to FIGS. 5–8, which shows another embodiment, there are illustrated portions of a manifold unit having a yoke 16, to be tightened in place by rotation of bar 34 by manual engagement of its handle portions 32, 32' for gas cylinder engagement. The unit is provided with a modified locking collar 112 having teeth 152 of the geometry shown in FIG. 5A. Said teeth 152 define between them recesses as at 153. Each such tooth is provided on its right hand side with a shoulder 152' which is essentially linear through a region of the otherwise curvilinear recess 153, the linear portion defining a slope of approximately 30° relative to a plane perpendicular to the longitudinal axis of collar 112. Thus, teeth 152 are of a ratchet-defining offset character. As the spring within collar 112 biases it upwardly into engagement with handle portions 32, 32', these portions will nest in recesses 153 but the handle can be turned readily, causing portions 32, 32' to ride up the slope of each tooth portion 152' and over the crest or edge of the tooth into the next recess 153. In this manner, collar 112 provides one-way ratcheting movement of handle bar 34 in the clockwise direction for permitting further tightening of stem 26 but the relatively steep portion 153' on the trailing edge of each tooth is such as to effectively preclude rotation of bar 34 in the counter clockwise direction, unless collar 112 is pressed manually against the force of the spring toward the manifold assembly for releasing the pressure of sleeve 112 against the tee-handle portions 32, 32' locking collar version of FIGS. 5-8.

In other respects, locking collar 112 is like locking collar 12, and is formed of a metal alloy sleeve 144 closed at its upper end by an annular plate 146 and provided with opposed rectangular cut-outs, i.e., recesses, 148, 148' in its lower portion. An opening 147 in plate 146 admits the head 30 of the tightening screw. Although not shown, a spring like that designated 56 (FIG. 4) is used to bias locking collar 112 upwardly for locking engagement of the tee-handle.

Accordingly, the arrangement provides ratcheting tightening of the tee-handle bar 34 by clockwise manual rotation, but without requiring locking collar 112 to be held manually out of engagement with the handle portions 32, 32'.

Referring to FIG. 9, there designated generally at 210 is a gas pressure regulator assembly to which said sleeve 12 has been applied being mounted upon the yoke 220 of the regulator. The regulator includes a body 214 in which there is contained a pressure regulating mechanism which includes an inlet 238 and guides 240, 240' for engagement with a gas pressure cylinder, e.g., breathing oxygen. Threaded ports 241, 241' are provided in the body of the regulator for attachment of pressure gauges and other fittings. Further, there is provided at the lower end a ring 251 by which gas distribution assemblies may be attached, such as a flow control valve for providing metered flow of the breathing oxygen from the regulator 210. Sleeve 12 is of the configuration described hereinabove and is thereby of the configuration for engagement of the tee-configured bar 232 by which a stem 236 may be tightened to afix the regulator 210 to the source of oxygen. Accordingly, sleeve 12 prevents handle 234 from rotating, such as otherwise might cause the regulator to become detached.

Referring to FIGS. 10 and 11, a further locking sleeve embodiment 212 formed of a cylindrical metal sleeve 244 having a relatively thick upper closed end plate 246 in which is located a central opening 247 for receiving the tightening screen head. In the outer surface end plate, there are formed four intersecting pairs of diametrically opposed grooves so as to provide in actuality eight individual grooves 249, each having semicylindrical cross-section. Grooves 249 extend radially with respect to opening 247 fully across the surface of end plate 246 from its central opening 247 to open through the outer, upper periphery of collar 212. Rectangular openings, as at open from opposite sides of shell 244 from its lower edge for conforming to a yoke such as that designated 220 in FIG. 9, and a spring like that designated 56 (FIG. 4) is used to bias locking collar 212 upwardly for locking engagement of the tee-handle, which will seat in a diametrically opposed pair of recesses 249, the radius of which is preferably only slightly greater than that of the circular-section tee-handle for providing relatively tight, precise engagement positively preventing rotation thereof unless collar 212 is manually held down out of engagement with the tee-handle.

The invention is not limited to assemblies and apparatus attached to breathing oxygen, but can be applied as well to many types of mechanisms which are connected with gas pressure sources, such as welding gases, rare gases, and so forth.

In view of the foregoing, it will be seen that the several objects of the invention are achieved and other advantages are attained.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. A locking device for use with a gas flow distribution device to be connected to a source of gas under pressure, the device having a yoke for securement to the source and a fastening screw threaded in the yoke for securing the device to the gas source, the locking screw having a handle portion, the locking device comprising a collar including a sleeve defining opposed openings for engagement of the yoke to permit longitudinal movement relative to the yoke but substantially preventing rotation of the sleeve relative to the yoke when the collar engages the handle portion, the collar having a yoke-remote portion including a plurality of handle-engaging recesses, and means resiliently biasing the collar outwardly from the yoke into locking engagement of the handle-engaging recesses with the handle portion for generating a ratcheting effect to reliably lock the handle portion within the handle-engaging recesses to ensure that the handle portion does not become loose either from vibration or misuse, and thereby preventing unintended unfastening of the screw from the gas source to prevent a hazardous leakage condition.

2. A locking device according to claim 1 wherein the collar includes a plate extending across and closing a yoke-remote end of the sleeve, the plate defining a central opening for receiving a shank of the fastening screw.

3. A locking device according to claim 2 wherein the biasing means comprises a coiled compression spring interposed between the last-said plate and the yoke, and concentric with the fastening screw shank.

4. A locking device according to claim 3 wherein the compression spring being conical in configuration and including a large diameter portion bearing against the lost-said plate and a small diameter portion bearing against the yoke for permitting rocking of the collar about the yoke.

5. A locking device according to claim 4 wherein said opposed openings being sized for permitting the collar to rotate relative to the yoke a few degrees but to prevent further rotation thereof.

6. A locking device according to claim 2 wherein the collar defines an annular crown flange around a yoke-remote upper periphery thereof, the crown flange being of toothed configuration to define between pairs of teeth thereof said handle-engaging recesses.

7. A locking device according to claim 6 wherein the teeth are symmetric.

8. A locking device according to claim 6 wherein the teeth are of ratchet-defining offset character for one-way ratcheting engagement of the handle portion.

9. A locking device according to claim 8 wherein each such tooth is provided on one side with a shoulder which is essentially linear through a region of a corresponding recess defined between each pair of teeth, each such recess being otherwise curvilinear.

10. A locking device according to claim 9 wherein the linear tooth portion defines a slope of approximately 30° relative to a plane perpendicular to the longitudinal axis of the collar.

11. A locking device according to claim 2 wherein the handle portion is constituted by a tee-handle having a pair of oppositely disposed bar portions each of circular section.

12. A locking device according to claim 11 wherein the end plate having pairs of diametrically opposed grooves in an upper surface thereof extending radially with respect to the central opening for receiving the bar portions for locking engagement thereof.

13. A locking device according to claim 12 wherein the grooves are each of semicylindrical orientation and extend from the central opening to open through an outer periphery of the collar.

* * * * *